UNITED STATES PATENT OFFICE.

FRANCIS S. BENENATI, OF SYRACUSE, NEW YORK.

PROCESS FOR PRESERVING MATTER.

1,292,401.      Specification of Letters Patent.      Patented Jan. 21, 1919.

No Drawing.      Application filed May 31, 1918. Serial No. 237,452.

*To all whom it may concern:*

Be it known that I, FRANCIS S. BENENATI, a citizen of the United States, and a resident of Syracuse, in the county of Onondaga and State of New York, have invented a certain new and useful Process for Preserving Matter, of which the following is a specification.

I have discovered that destructible matter can be preserved indefinitely and restored or partly restored to its primary condition by treating the same with oil of plants of the *Allium* family and more particularly of the *Sativum* or garlic species.

My invention therefore has for its object a process for preserving and restoring animal and vegetable matter by applying thereto oil of plants of the *Allium* family. By animal matter is meant animal and human bodies or anatomical parts thereof and zoological, anatomical, pathological and biological specimens.

By vegetable matter is meant among others, such articles, as paper, cardboard, cloth, paints, painting on canvas, silk or other cloth, wood, glass and wood products, etc., which are destructible by bacteria.

One way of obtaining the oil is by macerating and grinding the bulbs or the leaves or the bulbs and the leaves and pressing the juice therefrom and filtering.

I carry out my process of preserving by treating the matter with the oil of garlic either in a volatile or fixed state and either full strength or diluted in water, and the matter may be treated by applying the oil to the surface thereof or in case of animal or human bodies by applying it to the surface or arterially.

It is my opinion that the oil is absorbed at least in some instances by the matter being treated in whatever manner the oil is applied.

The process consists in saturating the matter or the specimen with the oil of allium and thereafter drying it and it is kept in dried condition until desired to restore to its original condition, when it is restored to its original condition of pliability, etc., by immersing in water.

If the specimen is to be used immediately, it will do no harm to keep it in the oil of allium, although specimens preserved for future use are preferably dried. The specimens may however be left in the oil of allium indefinitely.

The time required to saturate the specimens depends upon conditions such as the size and density or porosity of the article or specimen.

The temperature at which the process is performed is normal atmospheric temperature, say anywhere from between the freezing and boiling temperatures.

The oil of allium is used alone but in some instances in which the tissues or cells collapse or distort before the allium enters them, a fixative as alcohol or formaldehyde is used which causes the allium to enter the cells more quickly, in fact, so quickly, that such tissues are preserved by the oil of allium in their original condition for histological, etc., studies.

It is only necessary to use a fixative when the cells are not supported by muscular tissue. The action of the allium is the same in all cases, and it alone is the preserving agent when absorbed into the matter to the saturation point.

My process is capable of wide use and has been used in preserving zoological, histological, anatomical, pathological and biological specimens, bugs, insects, etc., paper, cardboard, cloth, paints and paintings on canvas, silk or other cloth, wood, glass, paper, china, ivory, etc.

It has also been used to preserve manuscripts on papyrus, parchments, and not only preserves the paper and parchment but also the matter written or printed thereon whether in ink or pencil or other material.

In the case of paintings, paper, papyrus, parchments, manuscripts, etc., it is applied to the surface of the article.

In applying my process for embalming bodies the oil may be injected into the body arterially or applied to the surface thereof, or both, or by immersion or dipping. I have also used my process for preserving eggs by dipping or immersing the eggs in the oil of allium but not leaving them therein. After being dipped the eggs are stored dry until used when they are washed off and may be used in any manner that fresh eggs can be used. As the oil of allium acts as a germicidal agent to kill the bacteria which would destroy or change the condition of the egg, it does not act merely as a coating to exclude air or the elements.

In fact, I have discovered that my process of preserving is capable of wide use.

In any of the various uses, the preserving of the various articles is not due solely to fact that the oil of allium excludes or protects the article from the elements but is largely due to the germicidal, restorative, and healing power of the allium itself.

Histological, pathological, biological and anatomical specimens when treated by my process can be restored to their natural pliability, condition and volume for histological, pathological, biological and anatomical studies.

Obviously, this in itself is a great advantage as by my process shipping space can be reduced as it is not necessary to ship the articles or keep them stored until used, in cumbersome jars containing a preserving liquid.

What I claim is:

1. The process of preserving animal or vegetable matter consisting in saturating such matter with an agent containing oil of a plant of the *Allium* family.

2. The process of preserving animal or vegetable matter consisting in saturating such matter with an agent containing a germicidal oil of a plant of the *Allium* family and thereafter drying said matter.

3. The process of preserving animal or vegetable matter and restoring it to its original condition consisting in saturating such matter with an agent containing a germicidal oil of a plant of the *Allium* family, then drying said matter, thereafter immersing the same in water to remove the dried germicidal agent whereby the matter is restored to its original condition and then removing the matter from the water.

In testimony whereof, I have hereunto signed my name, at Syracuse, in the county of Onondaga, and State of New York, this 29th day of May, 1918.

FRANCIS S. BENENATI.